United States Patent Office 2,849,480
Patented Aug. 26, 1958

2,849,480

PROCESS FOR THE PREPARATION OF 2,3,6-TRI-HYDROXYBENZOIC ACID AND DERIVATIVES

Algird Kreuchunas, Detroit, Mich.

No Drawing. Application October 5, 1956
Serial No. 614,077

4 Claims. (Cl. 260—473)

This invention relates to a novel process for the preparation of a new polyhydroxybenzoic acid and its derivatives. More particularly this invention concerns a unique method for the preparation of 2,3,6-trihydroxybenzoic acid and its esters and amides.

The compounds of this invention are represented by the formula (1)
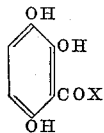

where X is a member of the group consisting of hydroxyl, lower alkoxyl with $C_1$ through $C_6$, and $NR_1R_2$ where $R_1$ and $R_2$ are members of the group consisting of hydrogen and lower alkyl with $C_1$ through $C_6$.

2,3,6-trihydroxybenzoic acid and its methyl ester have been described by Kreuchunas and Mosher, J. Org. Chem., 21, 589 (1956). The acid and ester were made by a long and inefficient method which differs in all respects from the process of this invention. The method of Kreuchunas and Mosher involves the carbonation of 2,3,6-trimethoxyphenyllithium, followed by demethylation with anhydrous aluminum chloride. The overall yield is poor.

The novel process of this invention consists of the following steps:

(2)
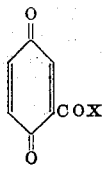

Step 1.
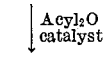

(3)
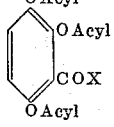

Step 2. | Alcohol
       | H+

(4)
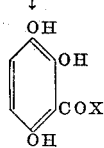

where X has the same significance as in Formula 1.

Step 1 of my process involves treating the quinone of Formula 2 with an acid anhydride such as acetic anhydride in the presence of a catalyst. The catalyst is taken from the group: sulfuric acid, phosphorus pentoxide, hydrogen fluoride, ortho-phosphoric acid and Lewis acids such as boron trifluoride and zinc chloride. The preferred catalysts are concentrated sulfuric acid or boron trifluoride. The reaction can be carried out in the presence of a solvent such as benzene or toluene or simply in the presence of an excess of the acid anhydride. The reaction can be carried out at or near room temperature with the preferred range being between 20 to 40° C.

Step 2 involves the mild hydrolysis of the triacyl derivative shown in Formula 3. The preferred method consists of treating the triacyl derivative with an alcohol such as methanol and a catalyst such as hydrochloric acid followed by a period of standing at room temperature or a short period of refluxing. Other methods of mild hydrolysis are available, e. g., in aqueous media, and the above treatment should not be construed as a limitation.

The starting quinones used in this invention and shown in Formula 2 can be prepared by methods given in the literature. For example, carboxy-p-benzoquinone (Formula 2, X equals hydroxyl) has been prepared by Lowenthal and Gagnon, Can. J. Research, 26E, 200 (1948). The esters, e. g., carbomethoxy-p-benzoquinone (Formula 2, X equals methoxyl) have been prepared by Brunner, Monatsh, 34, 913 (1913).

Illustrative of the compounds prepared according to the process of my invention are:

2,3,6-trihydroxybenzoic acid
Methyl 2,3,6-trihydroxybenzoate
Ethyl 2,3,6-trihydroxybenzoate
n-Butyl 2,3,6-trihydroxybenzoate
2,3,6-trihydroxybenzamide
N-methyl-2,3,6-trihydroxybenzamide
N,N-dimethyl-2,3,6-trihydroxybenzamide
N,N-diethyl-2,3,6-trihydroxybenzamide The compounds of this invention have been found to be useful as therapeutic agents in the treatment of rheumatic fever.

In order to better understand the invention reference should be had to the following illustrative examples. Parts are given by weight unless otherwise specified.

EXAMPLE 1

Preparation of methyl 2,3,6-trihydroxybenzoate

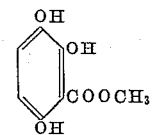

To a mixture of 5 parts of methyl gentisate, 8 parts of anhydrous sodium carbonate and 50 parts by volume of benzene is added a freshly prepared suspension of 17 parts of silver oxide in 100 parts by volume of benzene. The mixture is warmed on a water bath at 45° C. for five minutes, allowed to stand at room temperature for an additional 20 minutes, filtered and washed with warm benzene. The quinone filtrate is orange.

The quinone can be isolated at this point or the next step can be carried out with the benzene solution. If the solution is used the remaining reactions are carried out as follows:

To a mixture of 50 parts of acetic anhydride and 2 parts by volume of concentrated sulfuric acid is added slowly and with mixing the benzene solution of carbomethoxy-p-benzoquinone prepared above. The mixture is allowed to stand for three hours, then heated to refluxing for 30 minutes, cooled, poured into 150 parts of cold water and shaken vigorously. The clear yellow benzene layer is dried over anhydrous sodium sulfate.

To the benzene solution of the triacetate of methyl 2,3,6-trihydroxybenzoate is added 50 parts by volume of methanol and 5 parts by volume of concentrated hydrochloric acid. The mixture is refluxed for one hour and the solvent is removed under reduced pressure. On cooling a yellow solid separates which can be recrystallized from benzene, M. P. 139.5–141° C. The yield of product is 1.5 parts.

This material was compared by mixed melting point with an authentic sample of methyl 2,3,6-trihydroxybenzoate prepared by the method of Kreuchunas and Mosher, J. Org. Chem., 21, 589 (1956). There was no melting point depression.

EXAMPLE 2

*Preparation of methyl 2,3,6-trihydroxybenzoate*

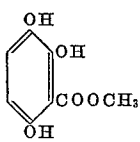

Carbomethoxy-p-benzoquinone is prepared from methyl gentisate as shown in Example 1 and isolated from the benzene solution as an orange-yellow powder.

Solid carbomethoxy-p-benzoquinone (3 parts) is added slowly and with rapid stirring to 30 parts of acetic anhydride and one part by volume of concentrated sulfuric acid at 30 to 40° C. The reaction mixture is allowed to stand for one hour and is poured into 250 parts of water and collected. The triacetate of methyl 2,3,6-trihydroxybenzoate is treated with 50 parts by volume of methanol and five parts by volume of centrated hydrochloric acid, refluxed for one hour and the solvent is removed under reduced pressure. The product solidifies on cooling and is collected and dried.

EXAMPLE 3

*Preparation of 2,3,6-trihydroxybenzoic acid*

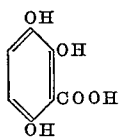

To a suspension of gentisic acid (13 parts) in 300 parts by volume of carbon tetrachloride at room temperature is added six parts by volume of crude nitrogen oxides over a period of five minutes with rapid stirring. The crude mixture of nitrogen oxides which is predominantly nitrogen tetroxide is prepared by the method of Brook, J. Chem. Soc., 1952, 5040. Stirring was continued for five minutes and the solvent is removed by distillation under reduced pressure.

The crude carboxy-p-benzoquinone ((11 parts) is added slowly to a stirred mixture of 60 parts of acetic anhydride and one part by volume of concentrated sulfuric acid at 30 to 40° C. The reaction mixture is allowed to stand for one hour and is poured into 400 parts of water. The product, the triacetate of 2,3,6-trihydroxybenzoic acid, is collected, washed, dried and treated with 75 parts by volume of methanol and five parts by volume of concentrated hydrochloric acid. The mixture is refluxed for one-half hour and the solvent is removed under reduced pressure. The 2,3,6-trihydroxybenzoic acid is collected, dried and can be recrystallized from nitromethane. A mixed melting point with an authentic sample of material prepared by the method of Kreuchunas and Mosher, J. Org. Chem., 21, 589 (1956) showed no depression. Seven parts of product is obtained.

EXAMPLE 4

*Preparation of 2,3,6-trihydroxybenzamide*

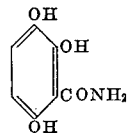

The amide of carboxy-p-benzoquinone is prepared from gentisamide by the method of Brook, J. Chem. Soc., 1952, 5040.

The amide of carboxy-p-benzoquinone (10 parts) is added slowly to a mixture of 60 parts of acetic anhydride and five parts of boron trifluoride etherate with rapid stirring at 30 to 40° C. The reaction mixture is allowed to stand for one hour and is poured into 400 parts of water. The product, the triacetate of 2,3,6-trihydroxybenzamide is collected, dried and treated with 75 parts by volume of methanol and five parts by volume of concentrated hydrochloric acid. The mixture is refluxed for thirty minutes and the solvent is removed by distillation under reduced pressure. The 2,3,6-trihydroxybenzamide is collected and dried, yielding 6.4 parts.

EXAMPLE 5

*Preparation of N,N-dimethyl-2,3,6-trihydroxybenzamide*

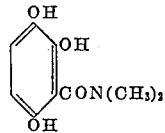

The N,N-dimethylamide of carboxy-p-benzoquinone is prepared from N,N-dimethylgentisamide by a modification of the method of Brook, J. Chem. Soc., 1952, 5040. Commercial nitrogen dioxide is used instead of the crude nitrogen oxides prepared by Brook.

The N,N-dimethylamide of carboxy-p-benzoquinone (10 parts) is added slowly and with stirring to a mixture of 60 parts of acetic anhydride and five parts by volume of concentrated sulfuric acid at 30 to 40° C. The reaction mixture is allowed to stand one hour and is poured into 400 parts of water. The product, the triacetate of N,N-dimethyl-2,3,6-trihydroxybenzamide, is collected, dried and treated with 75 parts by volume of ethanol and five parts by volume of concentrated hydrochloric acid. The mixture is refluxed for 20 minutes and the solvent is removed under reduced pressure. The N,N-dimethyl-2,3,6-trihydroxybenzamide is collected and dried, yielding 5.2 parts.

I claim:

1. In a process for preparing a compound of the formula:

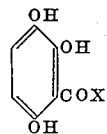

(I)

where X is a member of the group consisting of lower alkoxyl, amido and N,N-dialkylamido, the steps comprising treating a quinone of the formula

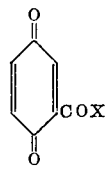

where X has the same significance as given above, with an acid anhydride in the presence of a preferred catalyst which is a member of the group consisting of sulfuric acid and boron trifluoride to obtain a compound of the formula

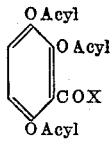

reacting the latter compound with an alcohol in the presence of a strong acid and recovering a compound of the Formula I.

2. In a process for preparing a compound of claim 1, the steps comprising treating a quinone of the formula

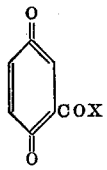

where X is a member of the group consisting of lower alkoxyl, amido and N,N-dialkylamido, with acetic anhydride in the presence of sulfuric acid to obtain a compound of the formula

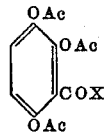

reacting the latter compound with methanol in the presence of hydrochloric acid and recovering a compound of the formula

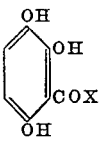

3. In a process for preparing 2,3,6-trihydroxybenzoic acid, the steps comprising treating carboxy-p-benzoquinone with an organic acid anhydride in the presence of a catalyst which is a member of the group consisting of sulfuric acid and boron trifluoride to obtain a compound of the formula

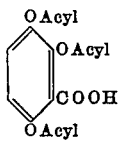

which is treated with an alcohol in the presence of a strong acid and recovering 2,3,6-trihydroxybenzoic acid.

4. In a process for preparing 2,3,6-trihydroxybenzoic acid, the steps comprising treating carboxy-p-benzoquinone with acetic anhydride in the presence of sulfuric acid as a catalyst, to obtain the triacetate of 2,3,6-trihydroxybenzoic acid which is then treated with methanol in the presence of hydrochloric acid and recovering 2,3,6-trihydroxybenzoic acid.

References Cited in the file of this patent

"Organic Synthesis," vol. I, pp, 317 and 318 (1914)
Rabjohn et al.: J. Org. Chem., 21, 218 and 219 (1956).
Kreuchunas et al.: J. Org. Chem., 21, 589 and 590 (1956).